United States Patent
Bresnan et al.

(10) Patent No.: US 6,429,946 B1
(45) Date of Patent: Aug. 6, 2002

(54) SYSTEM AND METHOD FOR BAR CODE RECOGNITION IN AN ELECTRONIC PRINTSTREAM

(75) Inventors: Mark Bresnan, Newtown; David P. Gardner, Southbury, both of CT (US)

(73) Assignee: Pitney Bowes, Inc., Stamford, CT (US)

( * ) Notice: Subject to any disclaimer, the term of this patent is extended or adjusted under 35 U.S.C. 154(b) by 0 days.

(21) Appl. No.: 09/385,546

(22) Filed: Aug. 30, 1999

(51) Int. Cl.[7] .............................................. G06K 15/00
(52) U.S. Cl. ...................................... 358/1.15; 118/1.9
(58) Field of Search ............................. 358/1.15, 1.18, 358/1.9; 234/462.14, 462.01

(56) References Cited

U.S. PATENT DOCUMENTS

| | | | | |
|---|---|---|---|---|
| 5,115,326 A | * | 5/1992 | Burgess | 358/440 |
| 5,489,763 A | * | 2/1996 | Conrad | 235/384 |
| 5,513,013 A | * | 4/1996 | Kuo | 358/448 |
| 6,076,733 A | * | 6/2000 | Wilz | 235/462.01 |
| 6,222,452 B1 | * | 4/2001 | Ahlstrom | 340/572.1 |
| 2002/0015166 A1 | * | 2/2002 | Wakai | 358/1.11 |

FOREIGN PATENT DOCUMENTS

JP         407044572 A    *   2/1995  ........... G06F/17/30

* cited by examiner

Primary Examiner—Jerome Grant, II
(74) Attorney, Agent, or Firm—Christopher J. Capelli; Angelo N. Chaclas

(57) ABSTRACT

A system and method for electronic printstream delivery including the steps of providing a database containing a plurality of electronic documents wherein at least some of the electronic documents have an associated barcode in an electronic printstream and splitting the electronic delivery printstream into a plurality of electronic documents. Once the electronic documents have been individually split from the electronic printstream the presence of electronic barcodes that are associated with at least some of the electronic documents are identified and interpolated. The electronic mail pieces are then generated using the information obtained from the identification of the electronic barcodes, wherein each electronic mail piece includes one of the plurality of electronic documents and at least some of the electronic mail pieces include respective electronic inserts. The electronic mail pieces are then delivered by an electronic delivery system.

18 Claims, 6 Drawing Sheets

SYSTEM AND METHOD FOR BAR CODE RECOGNITION IN AN ELECTRONIC PRINTSTREAM

TECHNICAL FIELD

The present invention relates to mass mail delivery mechanisms and, more particularly, to bar code recognition in an electronic printstream of an electronic delivery mechanism.

BACKGROUND ART

Many businesses currently send out mass mailings to their customers or prospective customers. For example, a utility, e.g. electric company, may send out hundreds of thousands of bills to its customers every month. As another example, a company may wish to send targeted marketing material, such as a sales letter, to prospective customers on a mailing list. In either example, a company may augment the bill or basic sales letter with additional material called "inserts," for example, a brochure or a glossy advertisement.

There currently exist computer systems, software, and specialized peripherals for producing mass mailings for physical delivery, e.g. through the U.S. Postal Service or by courier. With the advent of new forms of electronic mail delivery, however, it is becoming more desirable to augment existing mass mailing capability with electronic delivery mechanisms, such as by electronic mail (email), facsimile, pager, or publication to a page on the World Wide Web. However, there are many reasons why it is difficult to upgrade or replace these computers systems for electronic mail delivery.

Often these computer systems are called "legacy" computer systems because they are relatively old computer systems handed down from previous generations of company management. These legacy computer systems, however, are still effective and often control processing vital to the company's business, e.g. bill production. Such legacy systems for mass mailing document production typically run on a mainframe computer and are complex and expensive. Accordingly, companies are reluctant to modify, upgrade, or replace these critical document generation applications.

Another reason why upgrading a business application is difficult is that the business application is written by a third-party developer with exclusive access to the source code and unwilling or unable to upgrade the application. For example, the business application may have been written by a company that has gone out of business or discontinued support for that application.

Yet another reason it is difficult to transition from paper based mail to electronic mail is document recognition. That is, the recognition of individualized personal documents (e.g., billing statements) that is to be included in each mailpiece. For instance, in typical legacy printed applications, when a billing printstream is delivered to a printing mechanism, the printing mechanism causes the printstream to be generated into a plurality of billing statements, wherein each billing statement is of course unique to the intended recipient and includes a barcode that is unique to that recipient. The barcode is typically generated and embedded in the printstream by the legacy application and when printed and recognized by known scanning techniques, the barcode identifies unique information regarding the recipient of the mail piece. Such information can include addressing, geographic, demographic and insert criteria, which information is used by a document inserting system to build a mail piece around the recipient's personalized document. Thus the information included in the barcode of each personalized document is critical to the operation of the inserting system that is building the mail piece for the personalized document of each recipient.

But when an electronic mail piece generation and delivery system is coupled to the aforesaid legacy printstrean applications, the information embedded in the barcode in each document contained in a printstream can not be utilized by the electronic mail piece and generation system as each document is never printed. Thus the barcode associated by each document is never scanned and interpolated by the electronic mail piece generation and delivery system. In other words, the information embedded in the barcode associated with the document for each recipient is "lost" by the electronic mail piece generation and delivery system. Therefore, when such an electronic mail piece generation and delivery system is coupled to an existing legacy document printstream generating application, some of the information embedded in each document, via the barcode, contained in the printstream produced by the legacy application cannot be utilized by the electronic mail piece generation and delivery system.

Even if a company has access to the source code of its mass mailing application, the company may not have the resources in terms of time or programming staff to make the necessary modifications for electronic mail delivery to overcome the non-utilization of the barcode associated with each document in the printstream produced by a legacy printstream application.

SUMMARY OF THE INVENTION

There exists a need for adding capabilities of electronic mail delivery to existing mass mailing systems and to be able to interpolate electronic barcodes compiled in the raw printstream.

These and other needs are met by an electronic delivery system and method in which a database contains a plurality of electronic documents wherein at least some of the electronic documents have an associated barcode in an electronic printstream. An electronic document delivery system is coupled to the database and is operative for splitting the electronic printstream into a plurality of electronic documents. The electronic delivery system then integrates the electronic documents to identify the presence of barcodes which are associated with at least some of the electronic documents. The electronic delivery system then generates electronic mail pieces using the information obtained from the identification of the electronic barcodes. Next, an electronic message router delivers the electronic mail pieces.

BRIEF DESCRIPTION OF DRAWINGS

The present invention is illustrated by way of example and not by limitation, in the figures of the accompanying drawings, wherein elements having the same reference numeral designations represent like elements throughout and wherein.

DETAILED DESCRIPTION OF THE INVENTION

A system and method of physical and electronic printstream delivery are described. In the following description, for purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Figure 1:
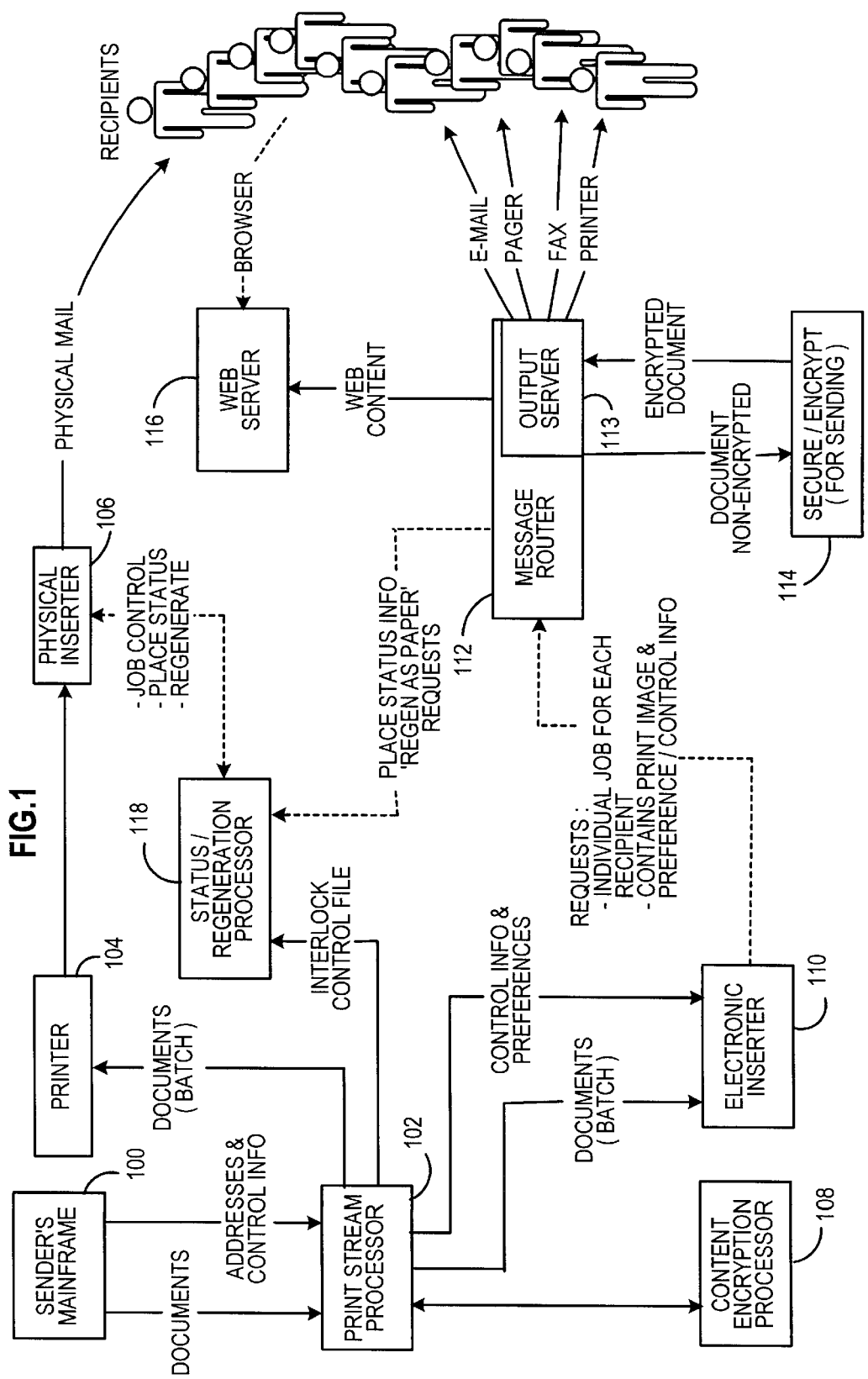
FIG. 1 is a diagram of the printstream delivery architecture according to an embodiment.

FIG. 1 depicts a printstream delivery architecture according to an embodiment of the present invention. A user at a sender's mainframe 100 submits to printstream processor 102 documents in a printstream, addressing information in the form of delivery preferences stored in a database, and control information specifying, e.g., what inserts are to be included with each document in the printstream.

A printstream may be a batch of documents or print images of documents produced by a third-party or legacy business application. For example, a billing system may produce a batch of bills that are to be printed and sent to each customer. By employing a printstream processor 102 as a post processor with supplemental addressing and control information outside of the business application that produced the printstream, the functionality of the business application can be extended without change to the business application.

Printstream processor 102 splits the submitted printstream into one of two printstreams based on the addressing information in the delivery preferences. One printstream is a physical delivery printstream, in which the documents are to be delivered, as specified in the addressing information, to a physical address via a physical delivery mechanism, for example, the U.S. Postal Service or a courier service. The other printstream is an electronic delivery printstream, in which the documents are to be delivered via an electronic delivery mechanism, e.g. the electronic mail or facsimile, as specified in the delivery preferences. Printstream processor 102 may encrypt the documents with a content encryption processor 108.

The physical delivery printstream is sent from the printstream processor 102 to a printer 104 where the documents in the physical delivery printstream are printed on a tangible medium such as paper. The printed documents are sent to a physical inserter 106 where they are processed into physical mail pieces. For example, a physical mail piece may contain a properly addressed envelope with the proper postage and stuffed with the printed document. In addition, the envelope may include additional printed matter, called physical inserts, selected according to criteria in the control information. The physical mail pieces are then ready for delivery by traditional means, e.g. through the U.S. Postal Service.

The electronic delivery printstream is sent to an electronic inserter 110, which separates out the individual documents in the electronic delivery printstream and combines the document with the appropriate electronic insert based on the control information to produce an electronic mail piece. Moreover, the nature of the electronic insert is tailored to the particular electronic delivery mechanism specified in the addressing information. For example, an insert for a facsimile delivery is another document faxed along with the individual document. As another example, delivery to a World Wide Web site involves an insert which is a link specifying the URL (Uniform Resource Location) of another page on the World Wide Web.

The separate electronic mail pieces are sent to message router 112 for delivery to the delivery mechanism specified in the addressing information, e.g. to a web server 116, electronic mail address, pager, facsimile machine, or a networked printer. The message router 112 is configured to send a separate notification via another delivery mechanism. For example, message router 112 may deliver an electronic mail piece to a web server 116 and send the recipient a generic fax that informs the recipient of the delivery to the web server 116. In addition, message router 112 may encrypt or otherwise provide for security of the outgoing electronic mail piece via security module 114.

If the electronic mail piece is not delivered after a certain length of time, the message router 112 generates and sends a "failed to process" or "failed to deliver" message to status/regeneration processor 118, which (depending on the users configured system, which system is configurable) may cause a physical version of the undelivered electronic mail piece to be produced by printer 104 and physical inserter 106 and delivery by physical means.

Printstream Processor

Figure 2:
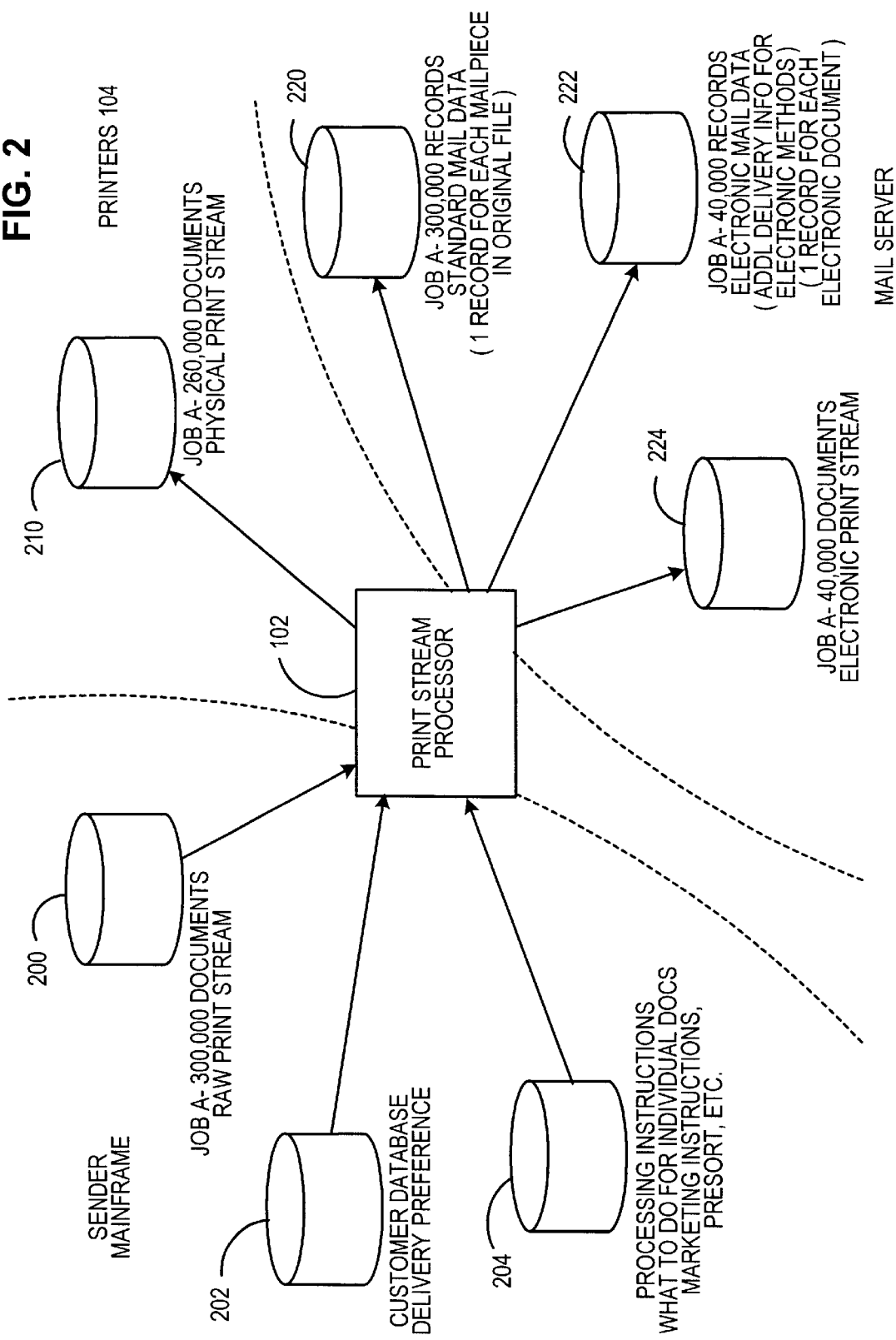
FIG. 2 is an input/output diagram of a printstream processor according to an embodiment.

Exemplary input and output of printstream processor 102 is illustrated in FIG. 2. A user at a mainframe may submit to the printstream processor 102 a job "A" comprising 300,000 documents in a raw printstream 200. This raw printstream 200 may be the output of a legacy application executing on the mainframe, wherein the raw printstream 200 preferably includes a barcode associated with each document or document set contained in the printstream 200. The barcode may be embedded in the printstream in any industry format including, but not limited to, AFP, AFPDS, DJDE line data, raw binary, PCL, ASCII and EBCDIC. As is conventional, the barcode may identify particular information relating to the intended recipient of the document(s) once generated, which information may include addressing, geographic, demographic information relating to the intended recipient as well as the identity of the document by account, name or other. The barcode may also be included only on the first document of a document set (i.e., the control document), which barcode is then utilized to inform the document generation system (e.g., printer 104 or electronic inserter 110) of how many documents subsequent to the control document belong to the document set for an intended recipient. It is to be appreciated that the printstream processor 102 may be an application executing on the same mainframe or an application executing on another computer, e.g. a workstation or PC, networked to the mainframe.

The printstream processor 102 utilizes a customer database 202 of delivery preferences that indicate how each document for each recipient is to be delivered, e.g. physically, by fax, etc. Control information 204 is also input to printstream processor 102 to specify processing instructions, for example, which inserts are to be included and whether to presort the documents.

Printstream processor 102 separates the raw printstream into two printstreams, one for physical delivery and another for electronic delivery. In the example depicted in FIG. 2, printstream processor 102 separates raw printstream 200 into a physical delivery printstream 110 comprising 260,000 documents. Physical delivery printstream 210 is sent to printer 104 for the next step in the physical delivery process. The other printstream is electronic delivery printstream comprising the remaining 40,000 documents of the raw printstream 200. Electronic delivery printstream 224 is sent to electronic inserter 110 for the next step in the electronic delivery process.

Figure 3:
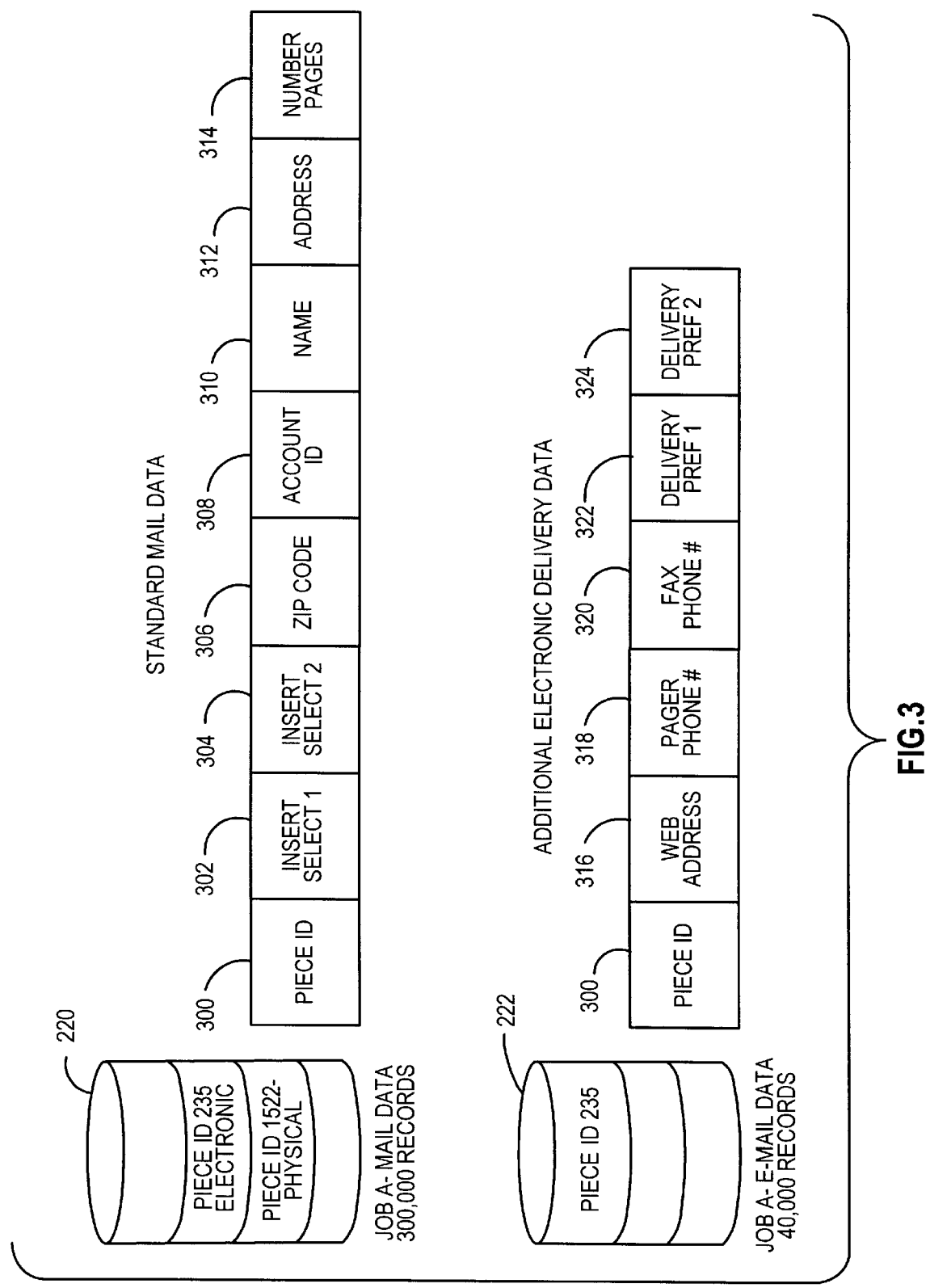
FIG. 3 is a diagram showing the format of records of the mail run datafile and of the electronic mail run datafile according to an embodiment.

Printstream processor 102 also produces two datafiles, mail run datafile 220 and electronic mail run datafile 222. Mail run datafile 220 contains one record for every document in the original raw printstream 200. The contents of each record in mail run datafile 220 is illustrated in FIG. 3. Each mail run datafile 220 record includes a piece identifier 300, which may specify the sort order of the documents. In addition, each record may contain one or two insert selections 302 and 304, which specify the insert(s) that may be included with the respective document. For example, an insert selection 302 for a physical mail piece may be a brochure describing a ski resort in Vermont. The mail run datafile 220 record also includes such physical delivery information as a ZIP code 306, an account identifier 308, a name 310, an address 312, and a number of pages 314 for the document. The mail run datafile 220 is used by the printer 104 and physical inserter 106 for generating physical mail pieces with the selected inserts and the proper physical mail address.

If a mail piece is to be delivered by electronic means, as specified in the customer database 202 of delivery preferences, the printstream processor 200 creates a record in the electronic mail run datafile 222 in parallel to the mail run datafile 220. Thus, the tenth record in electronic mail run datafile 222 corresponds to the tenth electronic mail piece in electronic delivery printstream 224. Each of the electronic mail run datafile 222 records contain a piece identifier 300, in order to match up with the corresponding record in the mail run datafile 220. The records also contain electronic delivery information derived from the customer database 202 such as a Web address or URL 316, a pager telephone number 318, and a fax number 320. In addition, the records contain delivery and notification preferences 322 and 324, to specify which delivery option is to be given priority. As described in more detail hereinafter, the electronic delivery information in records of the electronic mail run datafile 222 is attached to the respective electronic mail piece by electronic inserter 110 for delivery by message router 112.

Although mail run datafile 220 contains information mainly for physical delivery, all documents to be delivered electronically have a corresponding entry in mail run datafile 220 in case the mail piece has to be delivered physically. Electronic mail pieces may require physical delivery, via regeneration processor 118 described in more detail hereinafter, if the electronic delivery mechanisms do not successfully deliver the electronic mail piece. For example, electronic mail piece 235 in FIG. 3 has a record in both mail run datafile 220 and electronic mail run datafile 222.

Electronic Inserter

Figure 4:
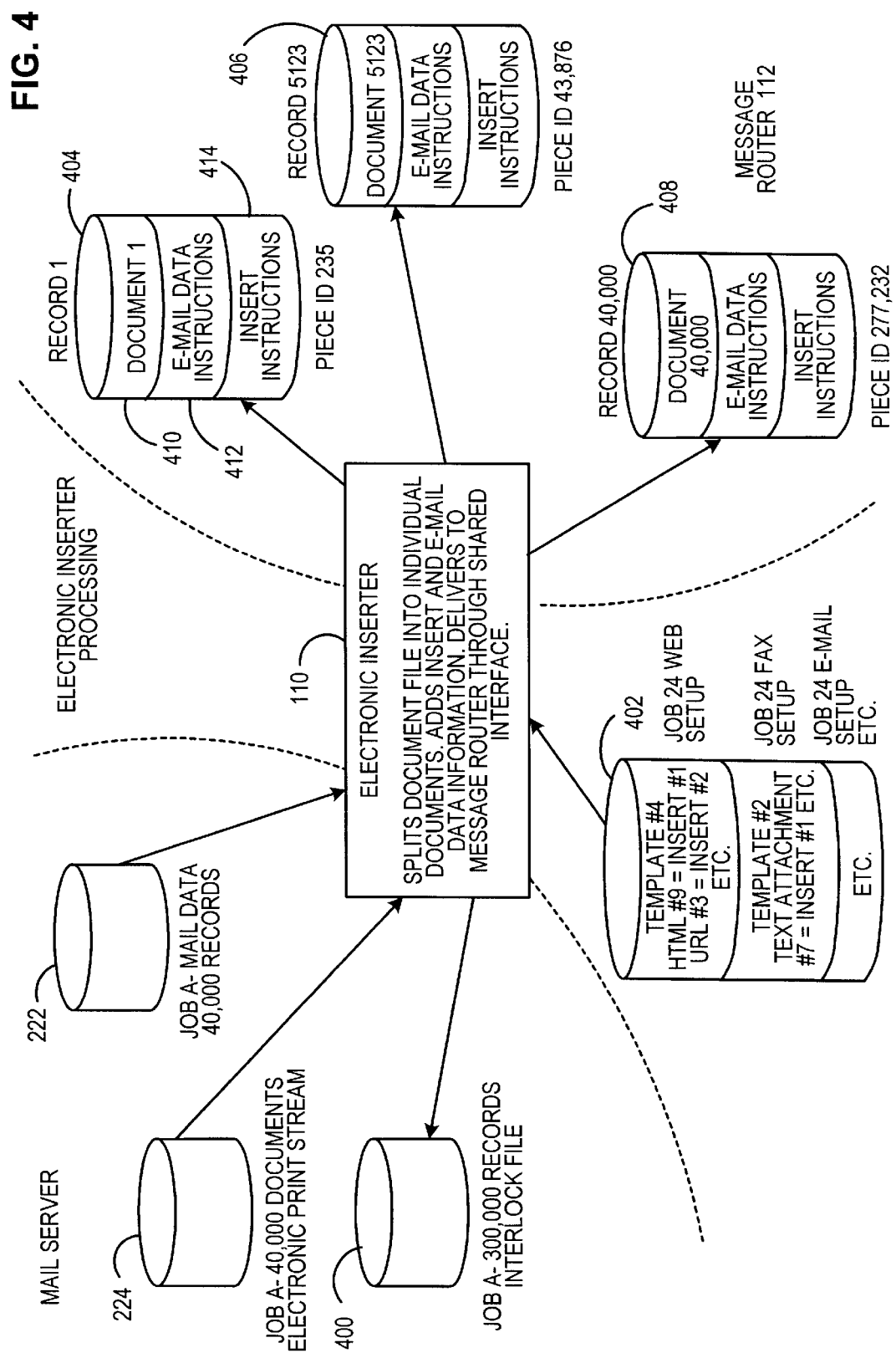
FIG. 4 is an input/output diagram of an electronic inserter according to an embodiment.

As depicted in FIG. 4, electronic inserter 110 splits the electronic delivery printstream 224 into individual electronic mail pieces and packages them with an insert appropriate for the electronic delivery mechanism specified for the electronic mail pieces. Electronic inserter 110 is preferably a computer software application, which may be executed on the same computer as the printstream processor 102 or another computer on the same network.

FIG. 4 depicts three electronic mail pieces 404, 406, and 408, which may be produced by electronic inserter 110. Each electronic mail piece, e.g. piece 404, comprises a document 410 obtained from electronic delivery printstream 224, which was split from raw printstream 200 by printstream processor 102. The electronic mail piece also includes electronic mail data instructions 412 derived from the corresponding record in the electronic mail run datafile 222, and insert instructions 404 derived from job setup file 402.

Additionally, electronic inserter 110, under software control, may interpolate the raw printstream 200 from the sender's mainframe 100, via print stream processor 102, to identify the presence of a barcode, in electronic form, that is associated with documents presented as electronic data in the raw printstream 200. Once identified, the barcode is preferably interpolated by the electronic inserter 110 to determine the information that corresponds with the barcode. For instance, when the raw printstream 200 are compiled in the sender's mainframe 100, the documents preferably have a barcode associated with them, which barcodes when identified by the electronic inserter 110 is used by the electronic inserter 110 to determine how may electronic documents are to be include in the electronic mail piece and which electronic inserts are to be included in the electronic mail piece that is to be electronically sent to the intended recipient. In other words, identification of the barcode by the electronic inserter 110 provides information relevant to the electronic inserter 110 to enable it to assemble an electronic mail piece.

It is to be appreciated that identification of the barcode is not to be limited to insert selection, but rather may be utilized by the electronic inserter 110 to enable it to perform various other functions associated with the production and/or transmission of the electronic mailpiece. It is to be further appreciated that the function of the barcode as complied in the raw printstream 200 by preferably the sender's mainframe 100 has the same result regardless of whether it is utilized in printed form by the physical inserter 106 or in electronic form by the electronic inserter 110. For example, with the functionality of a barcode being described above in conjunction with the electronic inserter 110 it may retain the identical functionality when printed and scanned by a scanner of an inserter system 106 so as to inform the control system of the inserter system 106 as to how many documents are to be included in a document set for an intended recipient as well as which inserts are to be included in the mail piece assembled (which of course includes the recipient's printed document set).

Alternative to barcode identification, inserts for each batch of mail can be defined by a job setup. For example, a record in the mail run datafile 220 may call for insert 1, which may be targeted marketing material for ski vacations in Vermont. In the physical inserter 106 a stack of brochures about ski resorts in Vermont may be loaded for insertion. In the case of the electronic inserter 110, for a particular batch of mail, the insert needs to be developed in a format appropriate for each delivery mechanism.

Accordingly, the job setup for this batch of mail, e.g. job setup file 402, contains a set of templates and inserts for each delivery mechanism. The job setup for the web server delivery mechanism may specify the URL of a home page for a Vermont ski resort. If the delivery mechanism is electronic mail, the corresponding insert may specify a text memo to be attached to an electronic mail message. It is possible for a job setup to specify no appropriate insert for a specific delivery mechanism, e.g. fax. It is noted that templates may specify logos and standard information to be included in each document. Job setups may also specify "hotlinks," which are inserts with no corresponding physical counterparts, for example, a corporate logo on a corporate web page.

Job setups can also specify a generic notification message for each delivery mechanism available for notification. For example, a fax may be sent to a recipient, informing the recipient that a web page includes his latest statement, for example a monthly billing statement. Generic notification messages are preferably not personalized, and so can be predefined for an entire job or batch of mail pieces. It is to be appreciated that the later notification messages may be personalized for each recipient.

Figure 5:
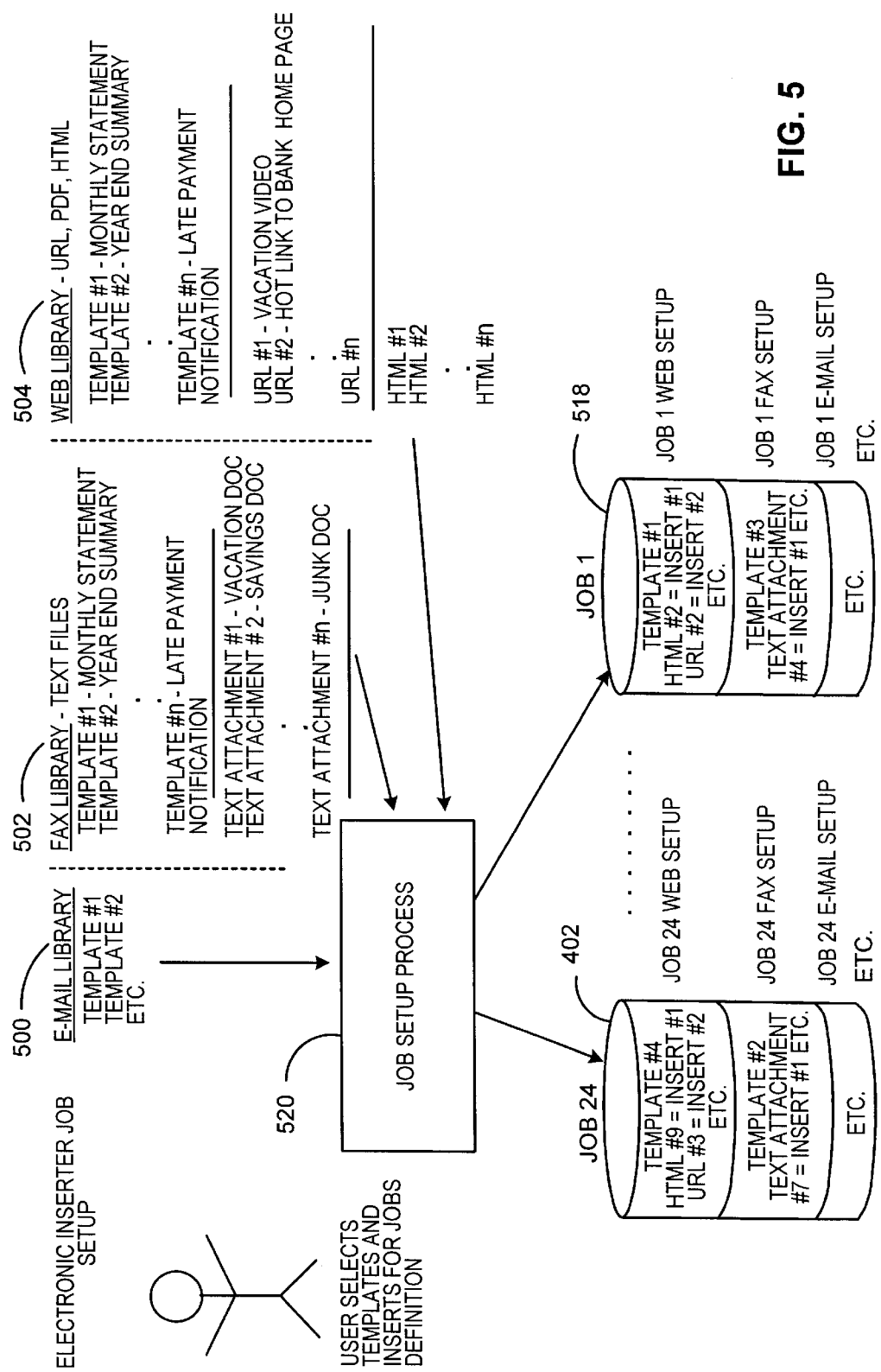
FIG. 5 is an input/output diagram of a job setup process according to an embodiment.

Referring to FIG. 5, job setups may be defined by a job setup process 520 (not shown in FIG. 1). The job setup process is an interactive application that allows a user to select templates and inserts for each delivery mechanism from a library. For example, electronic mail library 500 includes templates for formatting electronic mail messages. Fax library 502 may include templates and inserts as text files and text attachments to be sent along with a fax. Web library 504 includes the inserts in the form of URLs (web page addresses), PDF (Postscript Display Format, a portable display standard), or HTML (Hyper-Text Markup Language) files, which are common on the World Wide Web. Thus, the job setup process 520 prompts the user for templates, HTML files, text attachments, e.g. through a dialog box or a form for each electronic delivery mechanism. The job setup process 520 records and enables editing of the user's selections of templates and inserts for each electronic delivery mechanism. The output of the job setup process 520 is a job setup file, e.g. job setup file 402 and job setup file 518.

Referring back to FIG. 4, electronic inserter 110 applies job setup file 402 to a batch of mail pieces in the electronic delivery printstream 224 for producing electronic mail pieces 404, 406, and 408 with the appropriate insert instructions, e.g. insert instructions 414. The electronic inserter 110 also reads out corresponding records from electronic mail run datafile 222 for generating the application electronic delivery information 412 in each electronic mail piece. Furthermore, the electronic inserter 110 stores status information about each electronic mail piece in interlock file 400. Each electronic mail piece is placed on a server executing message router 112, which may be a separate server from the mail server upon which the electronic inserter 110 is executed.

Message Routing

The message router 112 detects that a new electronic mail piece has been received from the electronic inserter 110. The message router 112 decodes the delivery preference data 322 and 324, which was derived from the corresponding record in electronic mail run datafile 222 and appended to the electronic mail piece as electronic mail delivery instructions 412 by electronic inserter 110. Message router 112 sends the electronic mail piece to an output server subsystem 113 (shown in FIG. 1) for actual delivery. For example, if web server 116 is specified by the first delivery preference 322, the output server subsystem 113 sends the electronic mail piece to web server 116. The system may be configured to wait for a preset amount of time, e.g. four days, for the recipient to access the web page where the electronic mail piece was delivered. If the recipient has not accessed the web page in the preset amount of time, the electronic mail piece is considered not be delivered. For other delivery mechanisms, the delivery failure may be detected more directly, e.g., in the case of a busy signal for a fax number.

If the electronic mail piece is not delivered according to the delivery mechanism specified in the first delivery preference 322, the corresponding document is processed according to the second delivery preference 324 until all the delivery preferences have been exhausted. Status for each electronic mail piece is reported to status/regeneration processor 118 and stored in the interlock file 400. It is important for the message router 112 to be provided with a complete electronic delivery package, that is an electronic mail piece with insert instructions 414 for each electronic delivery mechanism, because the electronic mail piece may be in process for many days after the electronic inserter 110 has processed the entire batch. For example, the message router 112 may have to wait days for the Web server 116 to be accessed before utilizing the second delivery option.

The message router 112 electronically communicates with the electronic inserter 110 through known transmission techniques. For example, a separate downloaded configuration file (not shown) may specify whether to stop processing or ignore when an attachment file is missing. There is also communication for indicating that error conditions have been fixed and that the message router 112 should restart processing if stopped.

Status/Regeneration Processor

Figure 6:
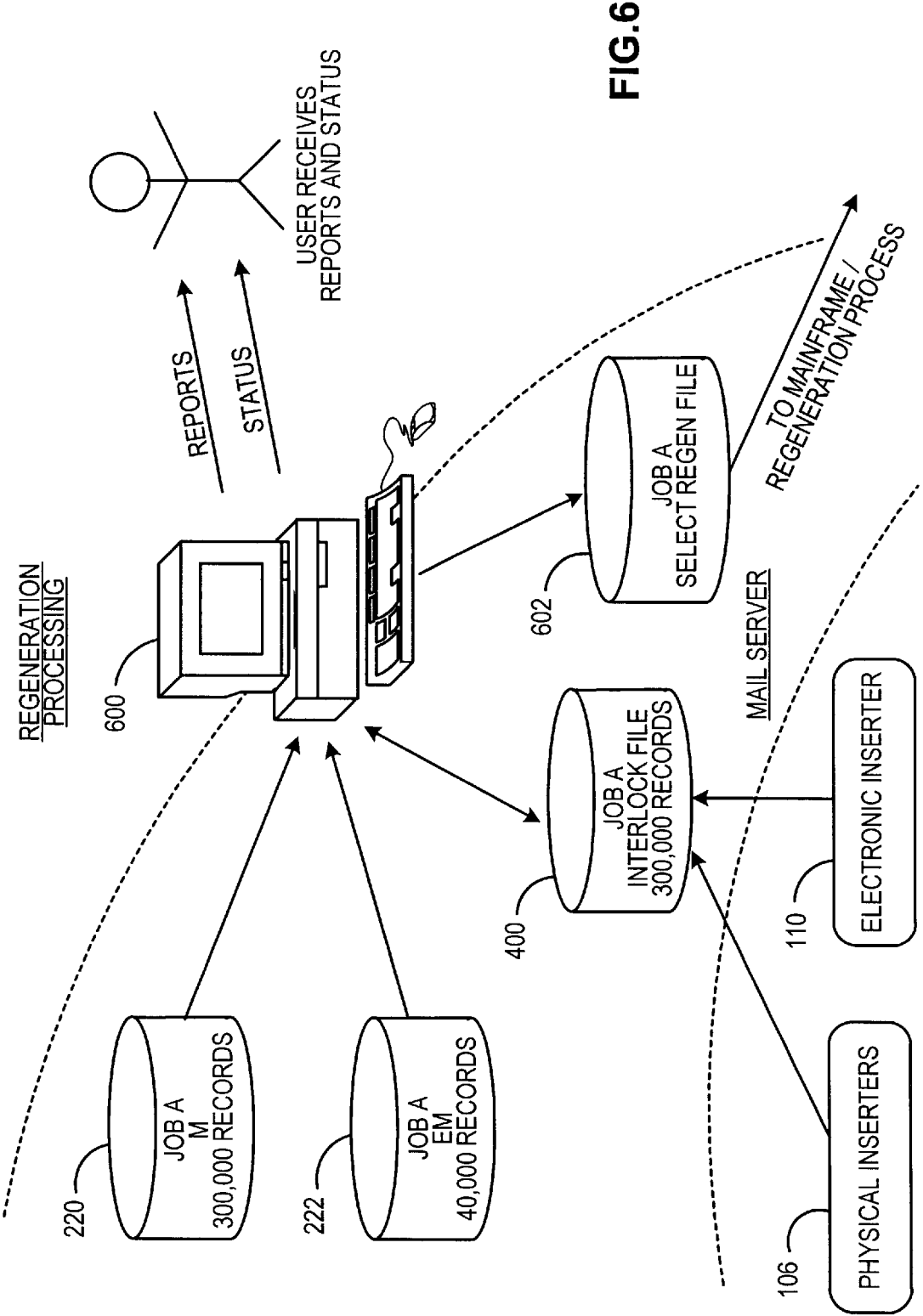
FIG. 6 is an input/output diagram of a regeneration processor according to an embodiment.

The interlock file 400 is used for checking document status and determining which electronic mail pieces need to be regenerated if all the electronic delivery mechanisms have proved unsuccessful. In particular, the status/regeneration processor 118, which may be a program executing on mail server 600 in FIG. 6, scans the interlock file 400 for documents whose status indicates that regeneration is necessary. For physical mail pieces this may occur because the physical inserter 106 generated a bad insert, e.g. an insert jammed. For electronic mail pieces, regeneration maybe necessary for those electronic mail pieces that have not been successfully delivered.

Accordingly, the regeneration processor 118 outputs a "regen" file 602 containing the piece identifiers 300 of the documents that need to be regenerated, printed by printer 104, and processed by physical inserter 106.

While the present invention has been described in connection with what is presently considered to be the most practical and preferred embodiments, it is to be understood that the invention is not limited to the disclosed embodiment, but, on the contrary, is intended to cover various modifications and equivalent arrangements included within the spirit and scope of the appended claims.

What is claimed is:

1. An electronic print stream delivery system, comprising:
a database containing a plurality of electronic documents wherein at lest some of the electronic documents have an associated barcode in an electronic printstream;
an electronic inserter coupled to the database and operative for splitting the electronic printstream into a plurality of electronic documents and identifying the presence of barcodes associated with at least some of the electronic documents and generating electronic mail pieces using the information obtained from the identification of the electronic barcodes; a message router for delivering the electronic mail pieces; and a regeneration processor for receiving piece status information from the message router and for causing a physical mail piece to be generated, corresponding to an electronic mail piece if the piece status information of the electronic mail piece indicates that the electronic mail piece has not been received.

2. The system of claim 1, wherein the message router is configured to deliver electronic mail piece by one of a plurality of delivery mechanisms in accord with a respective preference.

3. The system of claim 2, wherein the message router is configured to deliver at least one of the electronic mail pieces to a World Wide Web server and the electronic insert is a link to a page on the World Wide Web.

4. The system of claim 2, wherein the message router is configured to deliver at least one of the electronic mail pieces via electronic mail.

5. The system of claim 2, wherein the message router is configured to deliver at least one of the electronic mail pieces to a pager.

6. The system of claim 2, wherein the message router is configured to deliver at least one of the electronic mail pieces to a facsimile machine and the electronic insert is another document.

7. The system of claim 2, wherein the message router is configured to deliver at least one of the electronic mail pieces to a printer.

8. The system of claim 2, wherein the message router is configured to selectively deliver the electronic mail pieces to a web server, an electronic mail address, a pager, a facsimile machine, and a printer.

9. The system of claim 2, wherein the message router is configured to send a notification message by another of the plurality of delivery mechanisms.

10. The system of claim 1, wherein the identification of the electronic barcodes is operative to enable the electronic inserter to determine the electronic documents that are to be included in the mail piece.

11. The system of claim 1, wherein identification of the electronic barcodes is operative to enable the electronic inserts to determine electronic inserts to be included in the electronic mail piece.

12. A method of electronic printstream delivery, comprising the steps of:

providing a database containing a plurality of electronic documents wherein at least some of the electronic documents have an associated barcode in an electronic printstream;

splitting the electronic delivery printstream into a plurality of electronic documents;

identifying the presence of barcodes associated with at least some of the electronic documents;

generating electronic mail pieces using the information obtained from the identification of the electronic barcodes, wherein each electronic mail piece includes one of the plurality of electronic documents and at least some of the electronic mail pieces include respective electronic inserts; and delivering the electronic mail pieces.

13. The method of claim 12, further comprising the steps of:

receiving piece status information about an electronic mail piece; and causing a physical mail piece to be generated, corresponding to an electronic mail piece if the piece status information of the electronic mail piece indicates that the electronic mail piece has not been received.

14. The method of claim 12, wherein the step of delivering the electronic mail pieces includes delivering an electronic mail piece by one of a plurality of delivery mechanisms.

15. The method of claim 12, wherein:

the step of delivering an electronic mail piece includes delivering the electronic mail piece to a World Wide Web server; and the step of generating the electronic mail pieces includes inserting a link to a page on the World Wide Web in the electronic mail piece.

16. The method of claim 12, wherein the step of delivering an electronic mail piece includes delivering the electronic mail piece via electronic mail.

17. The method of claim 12, wherein the step of delivering an electronic mail piece includes delivering the electronic mail piece to a pager.

18. The method of claim 12, wherein:

the step of delivering an electronic mail piece includes delivering the electronic mail piece to a facsimile machine; and the step of generating electronic mail pieces includes the step of including another document with the electronic mail piece.

* * * * *